June 21, 1927.
E. C. PETSCH
1,633,348
STAY-PUT PARKING BRAKE
Filed Jan. 3, 1927
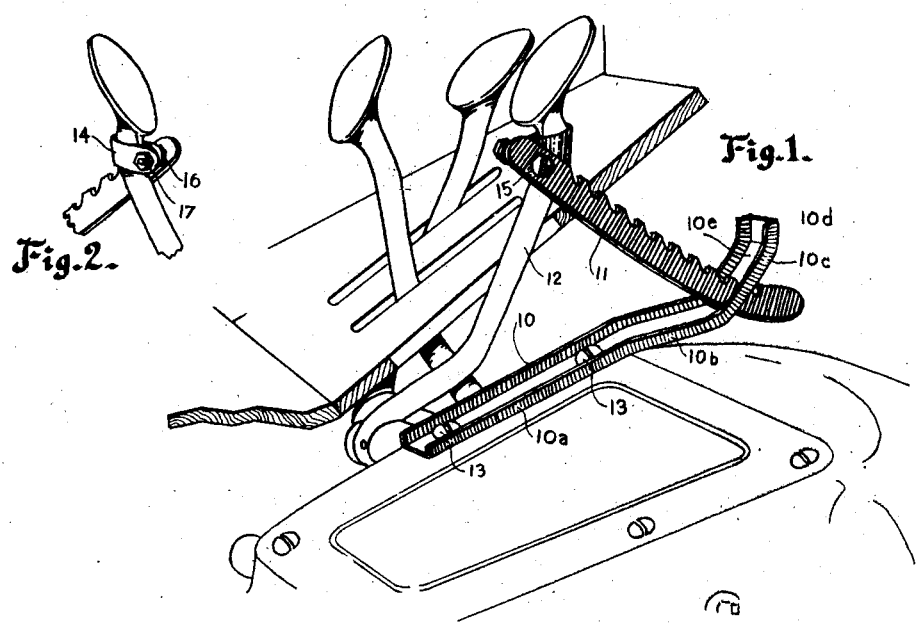
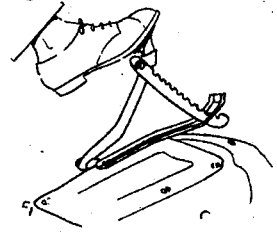
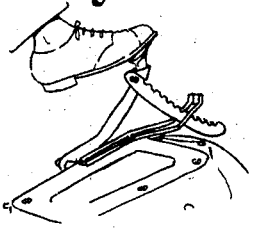
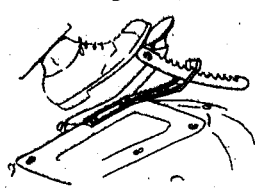
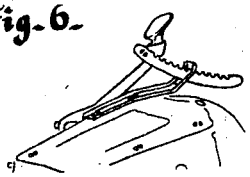
Everett C. Petsch, Inventor
Emil F. Lange, Attorney Patented June 21, 1927.

1,633,348

UNITED STATES PATENT OFFICE.

EVERETT C. PETSCH, OF PLEASANT DALE, NEBRASKA.

STAY-PUT PARKING BRAKE.

Application filed January 3, 1927. Serial No. 158,676.

My invention relates to parking brakes, it being my object to provide a device which may be easily secured to a Ford automobile without the necessity of drilling holes and using tools other than the wrench which is part of the regular Ford equipment, the function of the device being to provide an easily operated latch for holding the brake pedal in operative position when it is desired to park the automobile. It is, furthermore, my object to so design the attachment that it will not interfere with the normal operation of the brake pedal.

Having in view these objects and others which will be pointed out in the following description, I will now refer to the drawings, in which Figure 1 is an illustration showing the foot lever arrangement of a Ford automobile and showing my device attached to the brake pedal.

Figure 2 is an illustration showing the connection between my device and the brake pedal as seen from the left-hand side.

Figure 3 is an illustration of the brake pedal and of my device as they appear at the beginning of the operation.

Figure 4 is a view similar to that of Figure 3 but showing the position of the parts at an intermediate stage of the operation.

Figure 5 is an illustration showing the brake pedal fully depressed and showing also the action of the foot for throwing the latching lever into latching position.

Figure 6 is an illustration showing the foot pedal fully depressed and held in place by means of the latching lever.

The device comprises a base 10 which is secured to the Ford automobile and a latching lever 11 cooperating with the base 10 and pivotally secured to the pedal 12. The base 10 is preferably formed from channeled steel which has first a horizontal portion 10ª, then a forwardly and downwardly inclined portion 10ᵇ, then a forwardly and upwardly inclined portion 10ᶜ and a short vertical portion 10ᵈ. The horizontal portion 10ª is provided with two apertures for receiving the screws 13, these being two of the screws by means of which the transmission cover is secured in place. The two apertures are, of course, so spaced as to receive the two screws 13 which are a part of the Ford automobile and which are equally spaced in all cars of that make.

The latching lever 11 is pivotally secured to the pedal 12. For thus securing it without drilling holes I utilize a clip 14 which engages the pedal 12 at its neck. The screw or bolt 15 is passed loosely through the lever 11 and the nut 16 is threaded on to the bolt to provide a loose relation between the nut 16 and the head of the bolt 15. The clip 14 is U shaped and it is made from resilient material such as sheet steel. Its two portions are provided with apertures for receiving the bolt 15. For attaching the device to the pedal it is only necessary to pass the projecting end of the bolt 15 through the two apertures of the clip 14 and then to apply the nut 17, drawing it tight so that the clip is rigidly attached to the lever.

The part 10ᶜ of the base is provided with a slot 10ᵉ for receiving the end of the latching lever 11. The upper edge of the latching lever is provided with notches which are upwardly and rearwardly inclined, the notches being practically vertical when the lever is in its operative position. These notches are adapted to engage the lower edge of the vertical portion 10ᵈ of the base.

At the beginning of the operation, as shown in Figure 3, the various parts of the device are entirely out of the way and the foot pedal is operated in the usual manner. The lever 11 rides in the bottom of the notch 10ᵉ, as shown in Figure 4. In fact the brake lever may be used in its usual manner without in any way using the latching device. If, however, it is desired to latch the brake pedal in its operative position, as when leaving the car parked, it is only necessary to slide the toe of the foot against the rear end of the latching lever 11 to bring the teeth of the latching lever into contact with the portion 10ᵈ of the base as clearly shown in Figure 5. If the foot is then removed the parts will remain in the position as shown in Figure 6. To release the brake it is then necessary to apply a slight pressure to the foot pedal which releases the latching lever from engagement and permits it to drop to the bottom of the slot 10ᵉ.

While it is my object to provide a device which is to be chiefly used on the brake pedal of an automobile it is obvious that it has a number of other uses. It is sometimes desirable to provide such a device for the clutch pedal of a Ford automobile and since the device as above described is entirely symmetrical, it is possible to attach it to the clutch pedal with equal facility. The clutch pedal may then be latched in low or neutral, as desired. The device also has considerable use in connection with Fordson tractors. When it is desired to use the Fordson tractor for belt pulley work, the clutch pedal should be held in its neutral position but the tractor is not provided with means for latching it in such position. My device may be readily attached to the clutch lever of the Fordson tractor so that when it is desired to use the tractor for belt pulley work, it is only necessary to depress the clutch pedal into neutral and to then latch it in that position.

Having thus described my invention in such full, clear, and exact terms that its construction and operation will be readily understood by others skilled in the art to which it pertains, what I claim as new and desire to secure by Letters Patent of the United States is:

1. A parking brake for latching a brake pedal of an automobile in a predetermined position, said parking brake including a member which is adapted to be secured at a forward and upward inclination in a position forward of the pedal, a clip which is adapted to embrace the pedal and to be secured rigidly thereto, and a lever pivotally secured adjacent its rear extremity to said clip, said lever being provided with notches in its upper edge and said member being provided with an elongated aperture for slidably receiving said lever whereby downward pressure on said lever at its rear extremity will force its notched portion into latching engagement with said member.

2. A parking brake for latching a pedal of an automobile in a predetermined position, said parking brake including a member which is adapted to be secured at a forward and upward inclination in a position forward of the pedal, and a lever which is adapted to be pivotally secured to the pedal, said member being provided with an aperture for receiving said lever, the arrangement being such that the lever normally slides freely in the aperture of said member when the pedal is actuated but that it may at will be latched to said member.

3. A device of the character described including a base which is adapted to be secured in rigid relation to the transmission cover of an automobile, a forwardly and upwardly inclined extension on said base, said extension being provided with an elongated aperture, and a lever which is adapted to be pivotally secured to a foot lever of the automobile, said lever being provided with a toothed portion which is slidably positioned in the aperture of said extension.

In testimony whereof I affix my signature.

EVERETT C. PETSCH.